United States Statutory Invention Registration [19]

Huizer et al.

[11] Reg. Number: H656

[43] Published: Jul. 4, 1989

[54] METHOD AND SYSTEM FOR CONTROLLING THE MOMENTS OF FIRING OF MARINE SEISMIC SOURCES

[75] Inventors: Willem Huizer; Pleun M. van der Sman, both of Rijswijk, Netherlands

[73] Assignee: Shell Oil Company, Houston, Tex.

[21] Appl. No.: 646,273

[22] Filed: Aug. 31, 1984

[30] Foreign Application Priority Data

Oct. 11, 1983 [GB] United Kingdom ..... 8327177

[51] Int. Cl.[4] ..... G01V 1/38

[52] U.S. Cl. ..... 367/23; 181/110; 181/107

[58] Field of Search ..... 367/13, 15, 16, 19, 367/23, 144, 145, 146, 147, 190; 181/103, 107, 110, 115

[56] References Cited

U.S. PATENT DOCUMENTS

| | | | |
|---|---|---|---|
| 3,985,199 | 10/1976 | Baird | 181/107 |
| 4,038,630 | 7/1977 | Chelminski | 181/111 X |
| 4,066,994 | 1/1978 | Patchett et al. | 181/103 X |
| 4,106,585 | 8/1978 | Huizer | 181/107 |
| 4,210,222 | 7/1980 | Chelminski et al. | 181/107 |
| 4,240,518 | 12/1980 | Chelminski | 181/120 |
| 4,296,827 | 10/1981 | Thigpen et al. | 181/107 |
| 4,300,653 | 11/1981 | Cao et al. | 181/107 |
| 4,300,654 | 11/1981 | Raymond et al. | 367/146 X |
| 4,458,339 | 7/1984 | Wason | 367/23 |
| 4,486,864 | 12/1984 | Ongkiehong et al. | 181/107 X |
| 4,508,191 | 4/1985 | Manin | 181/107 |

FOREIGN PATENT DOCUMENTS 1193507 6/1970 United Kingdom .

*Primary Examiner*—Brian S. Steinberger
*Attorney, Agent, or Firm*—C. Alan McClure

[57] ABSTRACT

A method for controlling the firing times of a plurality of marine seismic sources which are towed as a seismic array behind a towing vessel is provided. The marine seismic sources are adapted to create seismic pulses after having been fired. The method measures and determines physical quantities representing the instantaneous operating depths of the individual seismic sources of the array and transmits the values of said quantities to a controling means for the seismic sources which compares the depth values thus obtained with predetermined depth values, and, if the measured depths are different from a preset depth, adjusts the firing times of the seismic sources of the seismic array in relation to the measured instantaneous depth values.

Apparatus for carrying out the method is also provided.

6 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD AND SYSTEM FOR CONTROLLING THE MOMENTS OF FIRING OF MARINE SEISMIC SOURCES

BACKGROUND OF THE INVENTION

The invention relates to a method and system for controlling the moments of firing of marine seismic sources which are towed as a seismic array behind a towing vessel.

The art of marine surveying by the use of seismic waves has achieved considerable importance and various methods and systems for conducting marine seismic surveying operations are well known.

It has now become common seismic practice to tow a marine seismic array comprising a plurality of seismic sources behind a towing vessel. The seismic array may also consist of at least two subarrays, each subarray carrying seismic sources.

In operating marine seismic sources, the seismic sources are fired by a controlling means and after a certain time delay seismic pulses are created. The seismic signals thus obtained are detected and processed further in any way suitable for the purpose.

When operating a plurality of marine seismic sources which are towed as a seismic array behind a towing vessel, the seismic sources can be fired in such a way as to increase the energy, improve directional properties and/or the quality of the seismic pulse needed in a seismic operation.

Another possibility of operating a plurality of seismic sources in a seismic array when applying wave generating techniques is the time-delayed firing of one or more seismic sources with respect to the firing of the other sources.

Usually this time-delay is in the order of 1-100 milliseconds.

In order to obtain an optimal and stable acoustic output of the array of sources it is desirable that the emitted seismic array signal which can be considered as a composition of the acoustic output of the respective individual seismic sources, has an optimum amplitude.

However, according to a generally known theoretical formula the dominant period of a seismic source signal in general is dependent on the source depth and in carrying out marine seismic operations with seismic sources of the explosive and implosive source type, for example air guns, water guns etc. it has appeared that the emitted seismic array signal is influenced by the depths at which the respective individual seismic sources of a seismic array are towed.

Due to several known reasons, for example wave action, speed variations etc. these source depths are not always the same in seismic operations. Thus, it appears that firing a plurality of seismic sources when towed at different depths and summing the obtained individual seismic signals will not give an optimum result as time shifts and differences in individual dominant periods are present.

Thus, it is desirable to synchronize the seismic sources in order to arrive at a certain wave front action by adjusting the delay between the moment of firing, or firing time, of the respective seismic source and the occurrence of the first peak of the seismic pulse, taking into account the seismic sources, instantaneous depths in determining the (electrical) firing time.

Seismic source signal synchronization as applied so far uses means for detecting the time at which an acoustic signal occurs, measured close to the seismic source. The timing history of previous shots is used to control the firing moment which is preformed by a controlling means for the seismic sources. This method, however, only compensates for average timing errors. These and other limitations and disadvantages of prior art are overcome and improved methods and apparatus for controlling the firing times of marine seismic sources are provided.

SUMMARY OF THE INVENTION

In a preferred embodiment, the method of the present invention measures all individual seismic source depths and applies appropriate individual seismic source deseismic sources is initiated by "command" signals and seismic source signal.

Therefore, it is an object of the invention to provide a synchronizing method for optimum wave front alignment in for example, split level arrays and/or arrays of sources the signature of which is depth dependent.

It is another object of the invention to provide a system for controlling the firing times, which is adapted to be applied as an additional control means in existing source controllers.

The invention therefore provides a method for controlling the firing times of at least two marine seismic sources which are towed as a seismic array behind a towing vessel, said marine seismic sources being adapted to create seismic pulses after having been fired, said method comprising the steps of measuring and determining physical quantities representing the instantaneous operating depths of the individual seismic sources of the array; transmitting the values of said quantities to a source controlling means; comparing the depth values thus obtained with predetermined depth values, and, if the said determined depth values are different from a preset depth value, adjusting the set points in time at which the seismic sources of the seismic array should generate their acoustic outputs in relation to the measured instantaneous depth values.

The invention also provides a system for controlling the firing times of at least two marine seismic sources which are towed as a seismic array behind a towing vessel, said marine seismic sources being adapted to create seismic pulses after having been fired, comprising a means for measuring and determining physical quantities representing the instantaneous operating depths of the individual seismic sources of the seismic array; a means for transmitting the values of the quantities thus obtained to a source controlling means; a means adapted to compare these said values to predetermined depth values, and means adapted to adjust in relation to the measured instantaneous depth values the set points in time at which the seismic sources should generate their acoustic outputs, if the measured depth values are different from a preset depth value.

The invention has been based upon accurate measurement of the depths at which the individual seismic sources of an array are towed. This measurement as such is based upon known principles, for example measuring the hydrostatic pressure of a column of (sea) water. These principles will not be described in detail since known to those skilled in the art. In practice the depth measurements may be carried out continuously or prior to each seismic source firing.

The invention will now be described in more detail by way of example in which reference will be made to the accompanying drawings.

DETAILED DESCRIPTION OF THE INVENTION

Figure 1:
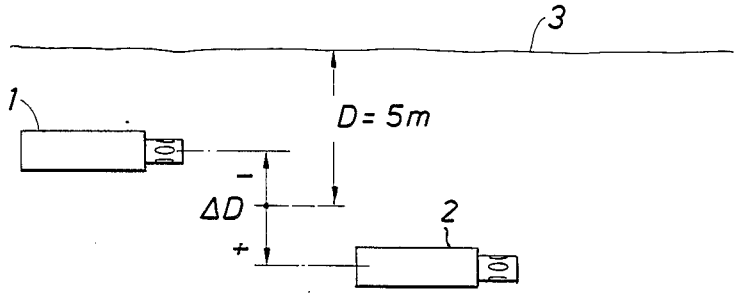
FIG. 1 represents schematically a seismic array comprising two marine seismic sources which are towed at different depths respectively.

With reference to FIG. 1 a seismic array comprising marine seismic sources 1 and 2 is represented schematically. As already indicated earlier these seismic sources are of the implosive type, for example water guns, etc. For reasons of clarity the towing vessel, connection cables, floating means etc. have not been represented as such technical particulars are known to those skilled in the art.

It is assumed that the seismic sources should be towed at a desired depth D, for example D=5 m, below the water surface 3. As already indicated earlier, depth variations due to several reasons are observed in seismic operations. In this example a depth variation $\Delta D=\pm 1$ m is assumed. Thus, seismic source 1 is towed at a depth $D-\Delta D=4$ m, whereas seismic source 2 is towed at a depth $D+\Delta D=6$ m. Such depth variations may for example, be caused by drag forces on the floating means tending to decrease the source depth with increasing towing speed.

Thus, as all seismic sources of an array may vary in depth, the respective individual seismic source signals will have a disadvantageous influence on their summation due to time shifts and differences in individual dominant periods and the summed emitted array signal will not have an optimum amplitude.

Figure 2:
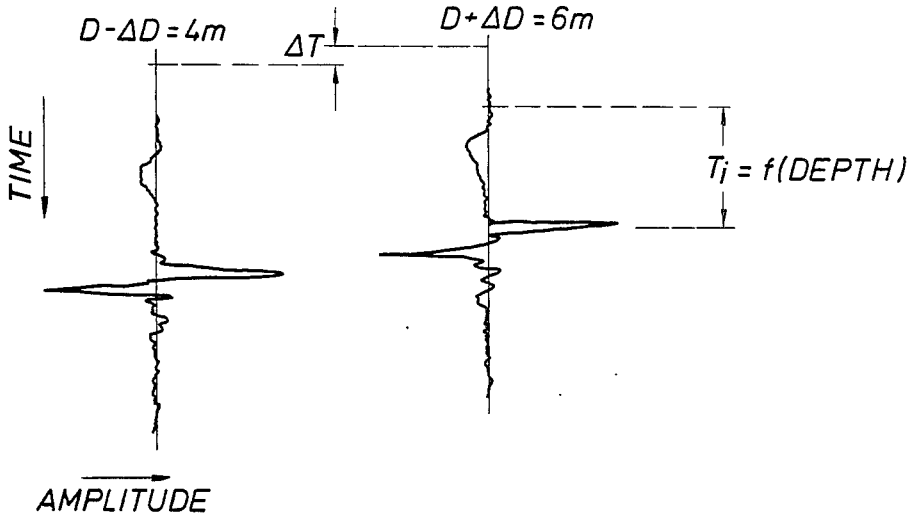
FIG. 2 represents the seismic pulses which are obtained after firing the seismic sources represented in FIG. 1.
Figure 3:
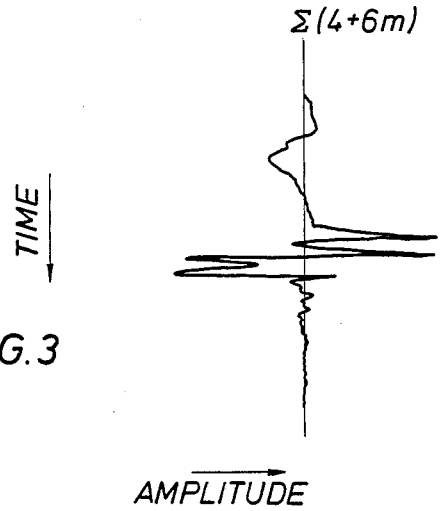
FIG. 3 represents the summation of the individual seismic signals represented in FIG. 2.

FIG. 2 represents seismic pulses which have been obtained after firing the seismic source 1 towed at $D-\Delta D=4$ m; the right side of FIG. 2 represents the seismic pulse originating from seismic source 2 towed at $D+\Delta D=6$ m. In case of simultaneously firing both seismic sources a difference in actual implosion occurrence is observed, which can be split up in a static time shift $\Delta$ T and a difference in implosion period $\Delta$ Ti. As already indicated earlier, Ti is generally dependent on source depth. As a result, only half the amplitude will be emitted as shown in FIG. 3 representing the summation of the individual seismic signals of the simultaneously fired seismic sources of FIG. 2.

Figure 4:
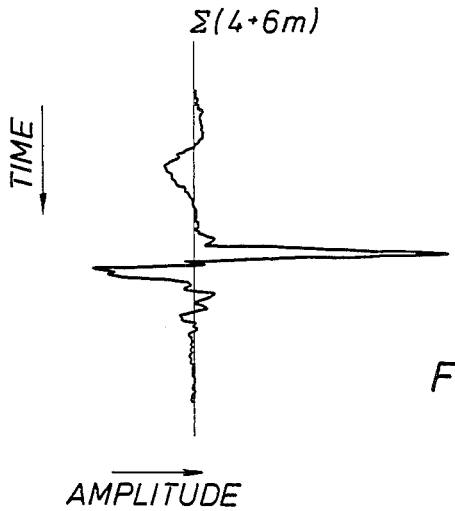
FIG. 4 represents the summed seismic signal obtained by adjusting the firing moments of the individual seismic sources of a seismic array by taking into account the instantaneous depths of the respective seismic sources according to the invention.

FIG. 4 shows the summation of the individual seismic signals if the firing times of the seismic sources 2 are adjusted in relation to the desired towing depth (5 m).

In this example, both sources will be fired with a delay. If both sources had been at the desired depth (5 m), the firing delay would have been a predetermined fixed value. For this example this fixed delay would be shortened for the gun at 4 m and increased for the gun at 6 meters.

As a result of this compensation, the summed acoustic (positive) pressure pulse will occur at the same time as would have been the case for both guns towed at 5 m.

In comparison to the case where no depth compensation is applied (FIG. 3) the summed amplitude has been increased considerably (FIG. 4).

Figure 5:
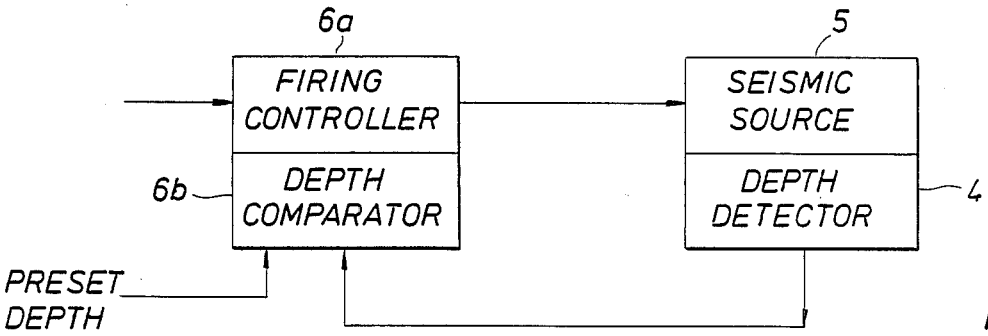
FIG. 5 represents a functional block diagram of apparatus of the present invention.

FIG. 5 shows a block diagram of an apparatus for employing the method of the present invention. A seismic source 5, the firing moment of which is controlled by a firing controller 6 has been represented schematically.

According to the invention the depth at which the said seismic source 5 is towed is measured by a suitable depth detector 4 and this depth information is transmitted in any way suitable for the purpose to the firing controller 6.

Subsequently the firing controller 6*a* adjusts the firing time of the respective seismic source 5 in relation to the measured depth; the measured depth values are compared with predetermined values by a depth comparator means 6*b* (which may be part of controller 6), and if the measured values are different from a preset value, the firing time is adjusted in such a way, that a change in firing time is generated in order to compensate for the instantaneous depth variation of the individual seismic sources in an array. It will be appreciated that these comparisons can be carried out by a suitable computer, or specially designed electronic circuitry.

The firing times are determined by the controller by means of suitable clock means (not shown for reason of clarity), taking into account the propagation velocity of the acoustic waves in the water. The actual firing of the seismic sources is initiated by "command" signals and will not be described in detail since known to those skilled in the art.

It will be appreciated that any suitable seismic array comprising any suitable number of seismic sources can be used.

It will further be appreciated that any depth measuring means suitable for the purpose can be applied provided that the depth can be measured accurately. An advantageous depth meter comprises a pressure-to-frequency transducer, the frequency variation of which represents a change in depth.

Various modifications of the invention will become apparent to those skilled in the art from the foregoing description and accompanying drawings. Such modifications are intended to fall within the scope of the appended claims.

What is claimed is:

1. A method for controlling the firing times of a plurality of marine seismic sources towed as a seismic array behind a towing vessel, comprising:

determining and measuring the instantaneous operating depths of the individual seismic sources of said array;

transmitting said instantaneous operating depths to a means for controlling said seismic sources;

comparing said determined depths thus obtained with predetermined depths; and adjusting the firing times of said seismic sources in functional relationship to the comparison of said predetermined and instantaneous depths.

2. The method described in claim 1, wherein said instantaneous operating depths of said individual seismic sources of said seismic array are determined and measured continuously.

3. The method described in claim 1, wherein said instantaneous operating depths of said individual seismic sources of said seismic array are determined and measured prior to each firing of said seismic sources.

4. Apparatus for controlling the firing times of a plurality of seismic sources towed as a seismic array behind a towing vessel, comprising:

means for determining and measuring the instantaneous operating depths of the individual seismic sources of said seismic array;

means for transmitting said instantaneous operating depths to a means for controlling said seismic sources;

means adapted to compare these said depths to predetermined depths; and means for adjusting the firing times of said seismic sources in functional relationship to the comparison between said predetermined and instantaneous depth values.

5. The apparatus described in claim 4, wherein said means for determining and measuring said instantaneous operating depths of said individual seismic sources of said seismic array, determines and measures said quantities continuously.

6. The apparatus described in claim 4, wherein said means for determining and measuring said instantaneous operating depths of said individual seismic sources of said seismic array, determines and measures said quantities prior to each firing of said seismic sources.

* * * * *